(12) United States Patent
Fero et al.

(10) Patent No.: US 9,922,737 B1
(45) Date of Patent: Mar. 20, 2018

(54) REACTOR INTERNALS SENSOR INSERTS

(71) Applicant: Westinghouse Electric Company LLC, Cranberry Township, PA (US)

(72) Inventors: Arnold H. Fero, New Kensington, PA (US); Joel A. Kulesza, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1184 days.

(21) Appl. No.: 14/203,679

(22) Filed: Mar. 11, 2014

(51) Int. Cl.
*G21C 17/10* (2006.01)

(52) U.S. Cl.
CPC ........... *G21C 17/10* (2013.01); *G21C 17/102* (2013.01)

(58) Field of Classification Search
CPC .............................. G21C 17/10; G21C 17/102
USPC ........................................ 376/245, 247, 254
See application file for complete search history.

(56) References Cited

U.S. PATENT DOCUMENTS

| 3,125,678 | A | * | 3/1964 | McCune ................. G01T 3/00 |
| | | | | 250/304 |
| 3,294,642 | A | | 12/1966 | Recule et al. |
| 3,549,492 | A | | 12/1970 | Ricci et al. |
| 3,604,934 | A | | 9/1971 | Melillo et al. |
| 3,720,581 | A | | 3/1973 | Kaser |
| 3,773,615 | A | | 11/1973 | Blatter |
| 3,971,944 | A | | 7/1976 | Quinby |
| 4,069,102 | A | | 1/1978 | Berringer et al. |
| 4,080,257 | A | | 3/1978 | Machado et al. |
| 4,157,277 | A | | 6/1979 | Marmonier et al. |
| 4,158,605 | A | | 6/1979 | Cooper, Jr. et al. |
| 4,670,212 | A | * | 6/1987 | Geoffray ............. G21C 17/112 |
| | | | | 376/247 |
| 4,683,108 | A | | 7/1987 | Balog |
| 4,711,760 | A | | 12/1987 | Blaushild |
| 4,844,858 | A | | 7/1989 | Fero et al. |
| 5,084,230 | A | | 1/1992 | Wood et al. |
| 5,257,295 | A | | 10/1993 | Chevereau et al. |
| 5,483,561 | A | | 1/1996 | Bystrak |
| 5,771,266 | A | | 6/1998 | Fabris |
| 5,825,024 | A | | 10/1998 | Badruzzaman |
| 6,164,886 | A | | 12/2000 | Matarazzo et al. |
| 6,247,884 | B1 | | 6/2001 | Bynum |
| 6,522,709 | B1 | * | 2/2003 | Hellandbrand ........ G21C 17/10 |
| | | | | 376/254 |

(Continued)

FOREIGN PATENT DOCUMENTS

| CN | 101471148 | 7/2009 |
| EP | 2 073 214 A2 | 6/2009 |

OTHER PUBLICATIONS

Extended European search report—15782914.4-1556/3117441—PCT/US2015014152, 7 pages.(Sep. 2017).

*Primary Examiner* — Jack W Keith
*Assistant Examiner* — Daniel Wasil
(74) *Attorney, Agent, or Firm* — Richard J. Coldren; Westinghouse Electric Company LLC

(57) ABSTRACT

A reactor internals component having a sensor insert for monitoring reactor internals components, supported within the reactor internals. The sensor insert has a hollow internal cavity that houses a number of compartmentalized, self-contained, passive environmental sensors. The sensor inserts are provided with a tracking code that can be employed to identify their location and orientation.

22 Claims, 8 Drawing Sheets

(56) References Cited

U.S. PATENT DOCUMENTS

| | | | | |
|---|---|---|---|---|
| 6,964,518 B1* | 11/2005 | Jagtoyen | ................ | G01K 13/08 |
| | | | | 374/117 |
| 80,503,775 | 11/2011 | Russell, II et al. | | |
| 8,615,065 B2 | 12/2013 | Balog | | |
| 2009/0135990 A1* | 5/2009 | Poon | ...................... | G21C 3/328 |
| | | | | 376/438 |
| 2010/0054893 A1 | 3/2010 | Christ | | |
| 2012/0195402 A1 | 8/2012 | Chahande et al. | | |
| 2013/0083879 A1* | 4/2013 | Heibel | ................ | G21C 17/102 |
| | | | | 376/153 |
| 2013/0153715 A1 | 6/2013 | Kulesza et al. | | |
| 2014/0307844 A1 | 10/2014 | Russell, II et al. | | |

\* cited by examiner

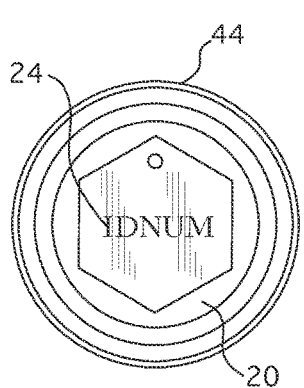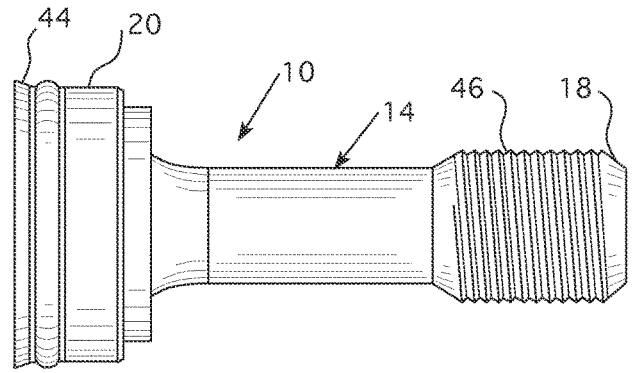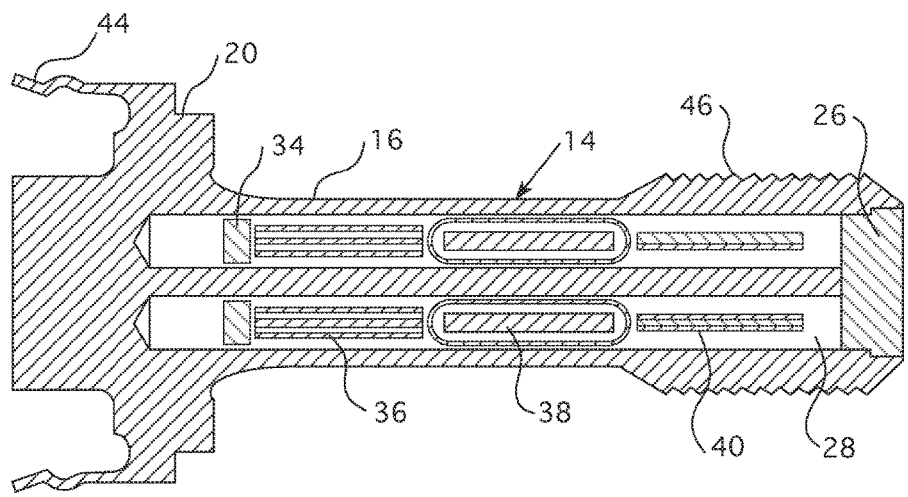

REACTOR INTERNALS SENSOR INSERTS

BACKGROUND

1. Field

This invention relates in general to nuclear reactors and, in particular, to sensor inserts employed in one or more internal components of a nuclear reactor, which house one or more environmental sensors.

2. Related Art

The fission reactions in a nuclear reactor generate heat and release neutrons which produce additional fission reactions in the nuclear fuel. The fissile material is massed in the reactor such that the neutron flux density is sufficient to maintain a sustained fission process. In a commercial reactor, pellets of the fissile material are encased in zircaloy rods mounted in modular, elongated fuel assemblies which are generally square in cross section. A large number of these square elongated fuel assemblies are arranged to form a generally cylindrical reactor core having a stepped periphery, which is housed inside a cylindrical stainless steel core barrel between horizontal upper and lower stainless steel core plates. This entire assembly is mounted inside a pressure vessel with generally hemispherical upper and lower heads. Reactor coolant, introduced into the pressure vessel through inlet nozzles, flows downward in an annular space between the core barrel and the pressure vessel, reverses direction in the lower plenum of the vessel, flows upward through openings in the lower core plate, and through the fuel assemblies where it is heated as a result of the fission reactions before being directed radially out of the pressure vessel through outlet nozzles. The heat extracted by the reactor coolant from the core is utilized to generate electricity thereby lowering the temperature of the reactor coolant which is recirculated through the reactor in a closed loop.

Since the fuel assemblies are square in cross section, an irregular space exists between the periphery of the core and the inner surface of the core barrel. The usual practice is to place longitudinally extending flat, baffle plates along the outer surfaces of the fuel assemblies to confine the upward coolant flow to the fuel assemblies. The baffle plates are held in place by horizontal, irregularly shaped former plates that are bolted to and between the longitudinal baffle plates and the core barrel. Holes in the former plates permit limited coolant flow in the generally annular space between the longitudinal baffle plates and the core barrel to provide cooling for these components and to equalize the pressure on both sides of the longitudinal baffle plates.

With an aging fleet of reactors around the world, there is a current need to extend the life of these reactors. To obtain operating license extensions a reactor operator has to show that the reactor vessel and its internal components can safely withstand the harsh environment that an operating reactor experiences over the period of the license extension. Computational models are often constructed of the components within and around the reactor pressure vessel in order to calculate the radiation environment that those components experience during plant operation. The results of those calculations are then often used with material behavioral correlations in order to predict the post irradiation behavior of various metals under different pressure and temperature conditions. Traditionally, the reactor pressure vessel has been the primary component of interest in these types of analysis. To that end, surveillance capsules are standard components within the nuclear reactor. The surveillance capsules contain material samples, dosimetry, and maximum temperature monitors, which are periodically tested to validate the computational models. Ex-vessel neutron dosimetry is another system that is used to validate those computational models.

The thermal behavior of the reactor vessel internals components, such as the baffle and former plates, which are subject to gamma ray interactions that lead to heat generation, are also of interest and can be calculated using similar computational models as those described previously. However, there is no device currently in existence that can be used to validate those calculations either for the thermal or radiation behavior of these components that is in close proximity to the baffle and former plates and other reactor vessel internal components such as the upper and lower core plates.

Accordingly, it is an object of this invention to provide an in-situ sensor that can be employed to determine the environment and the effects of the environment on the reactor internal components to better understand the state of these components and to validate the computational models.

SUMMARY

These and other objects are achieved by a reactor internals component having a sensor insert supported within the reactor internals. The sensor insert has a head and an elongated shank extending from the head to a distal end. The shank has a hollow compartment that extends at least partially between the distal end and the head. The cross sectional profile of the elongated shank is sized to fit into an opening in one or more reactor internals components. One or more self-contained, passive environmental sensors are secured within the hollow compartment which is closed off at the distal end by an end plug which is affixed to the shank.

In one embodiment, the environmental sensors comprise a plurality of environmental sensors, respectively configured to monitor different environmental parameters. Preferably, the one or more environmental sensors comprise material samples, dosimetry or maximum temperature monitors. Also, it is desirable that the reactor internals sensor insert includes one or more coded markings that can be used to identify the location of the sensor insert within the reactor internals and, preferably, also identify the orientation of the sensor insert within the reactor internals.

In another embodiment, the reactor internals sensor insert includes an anchor for fixing the elongated shank in the opening in the one or more reactor internals components. Preferably, the anchor comprises one of either a male or female thread extending over at least a portion of the shank, which is sized to mate with another of a male or female thread on the opening in the one or more reactor components into which the sensor insert is to be seated. Desirably, the anchor includes a locking mechanism that fixes an orientation of the shank within the opening in the one or more reactor internals components. The locking mechanism, for example, may be a lockbar that extends through an opening in the head and through a groove on the surface of the shank and partially into a groove in a surface of a wall on the opening in the one or more reactor internals components. Desirably, the lockbar is held in position within the opening in the head by a spring clip wedged against a portion of the head. The spring clip, for example, may be wedged in a counter bore in a surface of the head. In such case, desirably, the spring clip is a circular spring clip.

In still another embodiment, the shank has an axial dimension along an elongated dimension of the shank and the hollow compartment is partitioned into separate axial compartments in which the environmental sensors are respectively supported. Similarly, the hollow compartment may be partitioned into separate circumferential compartments in which the environmental sensors are respectively supported. The one or more environmental sensors may also be housed within a partitioned sheath within which the sensors are separated, with the sheath sized to slide into and out of the hollow compartment. The sheath preferably has a positioning feature that fixes the orientation of the sheath relative to the hollow compartment and desirably the sheath has a coded marking that can be used to identify the reactor internals sensor insert in which it resided. The sheath may also include a gripping feature proximate the distal end to ease movement of the sheath out of the hollow compartment.

The one or more environmental sensors may include a neutron activation wire that is enclosed within a stainless steel tubing, preferably with cadmium shielding. The shank preferably comprises Stainless Steel 347 and/or titanium. Preferably, the distal end of the shank has a larger circumference than a portion of the shank that extends from the enlarged head. In another embodiment, the head has a flared circumferential extension configured to mechanically engage with a circumferential machine groove or slot in the opening in the one or more reactor internals components.

BRIEF DESCRIPTION OF THE DRAWINGS

A further understanding of the invention can be gained from the following description of the preferred embodiments when read in conjunction with the accompanying drawings in which:

FIG. 5A is a front view of the embodiment illustrated in FIG. 4;

FIG. 5B is a side view of the embodiment illustrated in FIG. 4;

FIG. 5C is a cross sectional view of the embodiment shown in FIG. 4;

DESCRIPTION OF THE PREFERRED EMBODIMENT

Figure 1:
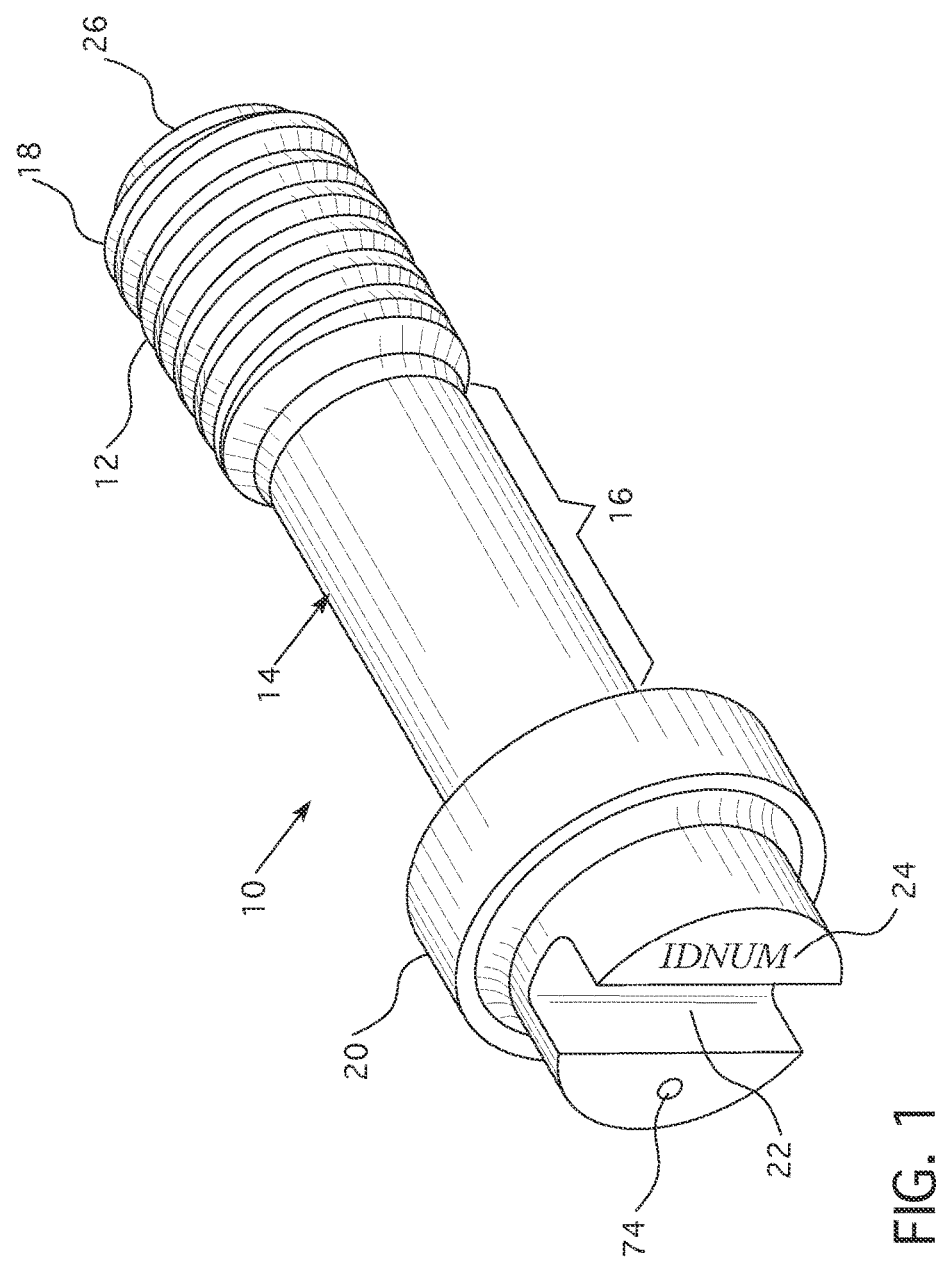
FIG. 1 is a perspective view of one preferred embodiment of the fastener sensor of this invention.
Figure 2A:
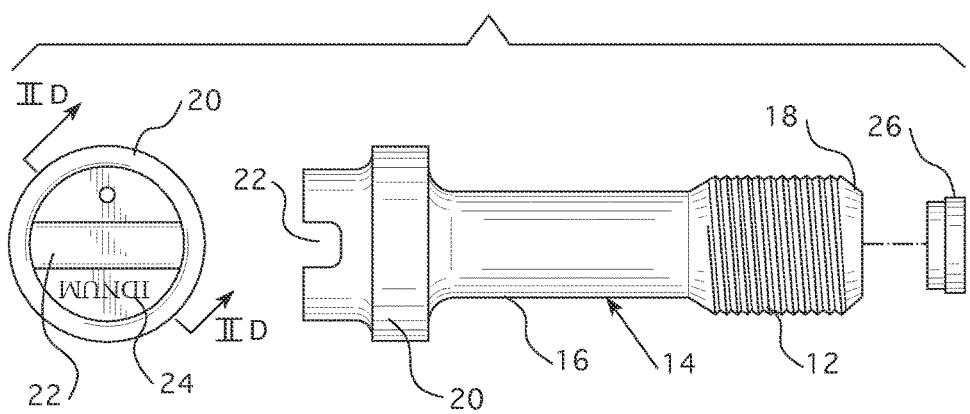
FIG. 2A is a front and side view of the embodiment shown in FIG. 1, with the end cap shown in an open position.
Figure 2B:
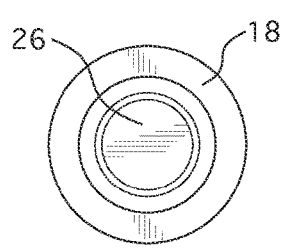
FIG. 2B is an end view of the embodiment shown in FIG. 2A.
Figure 2C:
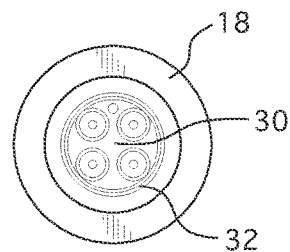
FIG. 2C is an end view of the embodiment shown in FIG. 2A with the end cap removed.
Figure 2D:
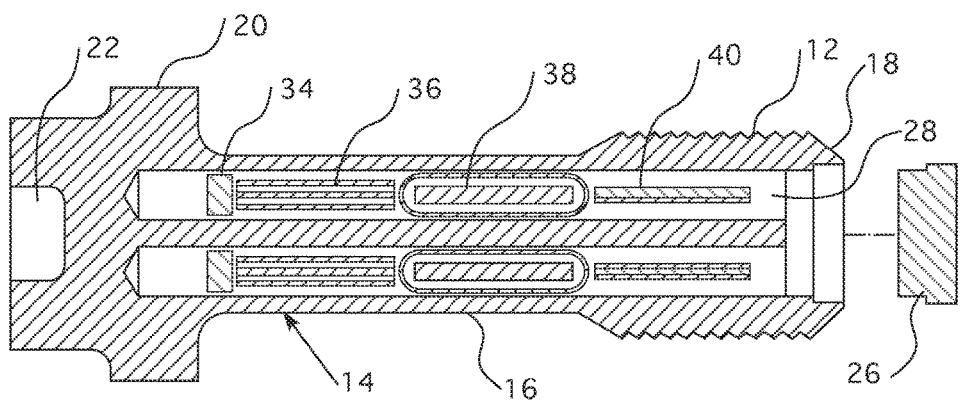
FIG. 2D is a cross sectional view of the embodiment shown in FIG. 2A.

Typically, reactor vessel internals components are bolted together as a means of attachment. However, the number of bolts and bolting patterns are often conservatively specified, meaning that some bolts are extraneous. As such, these bolts can be replaced by non-load-bearing bolts that are designed to provide an accurate characterization of the temperature and radiation environment in and around the reactor vessel internals components. One embodiment of the sensor insert of this invention, to replace one or more of such bolts, is the fastener 10, illustrated in FIG. 1, which is a bolt-type of a device that can be used to fasten together one or more reactor vessel internals components. As such, this embodiment has a partial or full length thread 12 along its shank 14 where the thread extends only partially along the shank 14. The thread 12 extends from a distal end 18 and terminates at a reduced diameter section 16. The opposite end of the reduced diameter section 16 is connected to the underside of the bolt head 20. The opposite side of the bolt head 20 is provided with a slot 22 to aid in tensioning the bolt 10.

The embodiment illustrated in FIG. 1 can have either or both a dimple 74 orientation mark and/or an identification/serial number 24 engraved to allow visual confirmation of the location and orientation of the bolt. Furthermore, the dimple orientation mark and/or an identification/serial number can allow personnel preparing the device to accurately record where and with what the device was loaded and to allow personnel unloading the device for post irradiation analysis to accurately characterize each component contained within the device. Internal features may also have the dimple orientation mark and/or an identification/serial number to ease the burden of record keeping.

Referring to FIG. 2, it can be appreciated that the shank 14 has a hollow cavity 28 extending from the distal end 18 towards the head 20 a distance that is dictated by the space required for a number of monitoring sensors that will be used to characterize the reactor environment within the vicinity in which the bolt 10 is placed. FIG. 2A is a schematic of the bolt shown in FIG. 1 with the end cap 26 that closes off the hollow cavity 28, shown withdrawn from the opening. FIG. 2B is an end view of FIG. 2A taken at the distal end 18. FIG. 2C is the end view shown in FIG. 2B with the end cap 26 removed, exposing a partitioned sensor module 30 enclosed within a metal sheath 32. FIG. 2D is a cross sectional view of FIG. 2A taken along the lines IID-IID thereof showing the sensors within the hollow cavity 28. The sensors are self-contained, passive devices that include one or more of a thermoluminescent dosimeter 34 or a LiF optical crystal; cadmium shielded, stainless steel clad, activation wire 36; eutectic maximum temperature melt wire 38; and unshielded, stainless steel clad, activation wire 40. A passive sensor is intended to refer to a sensory device that is dormant while in the reactor, i.e., not transmitting the information being acquired while within the reactor, out of the reactor, until removed from the reactor.

Figure 3:
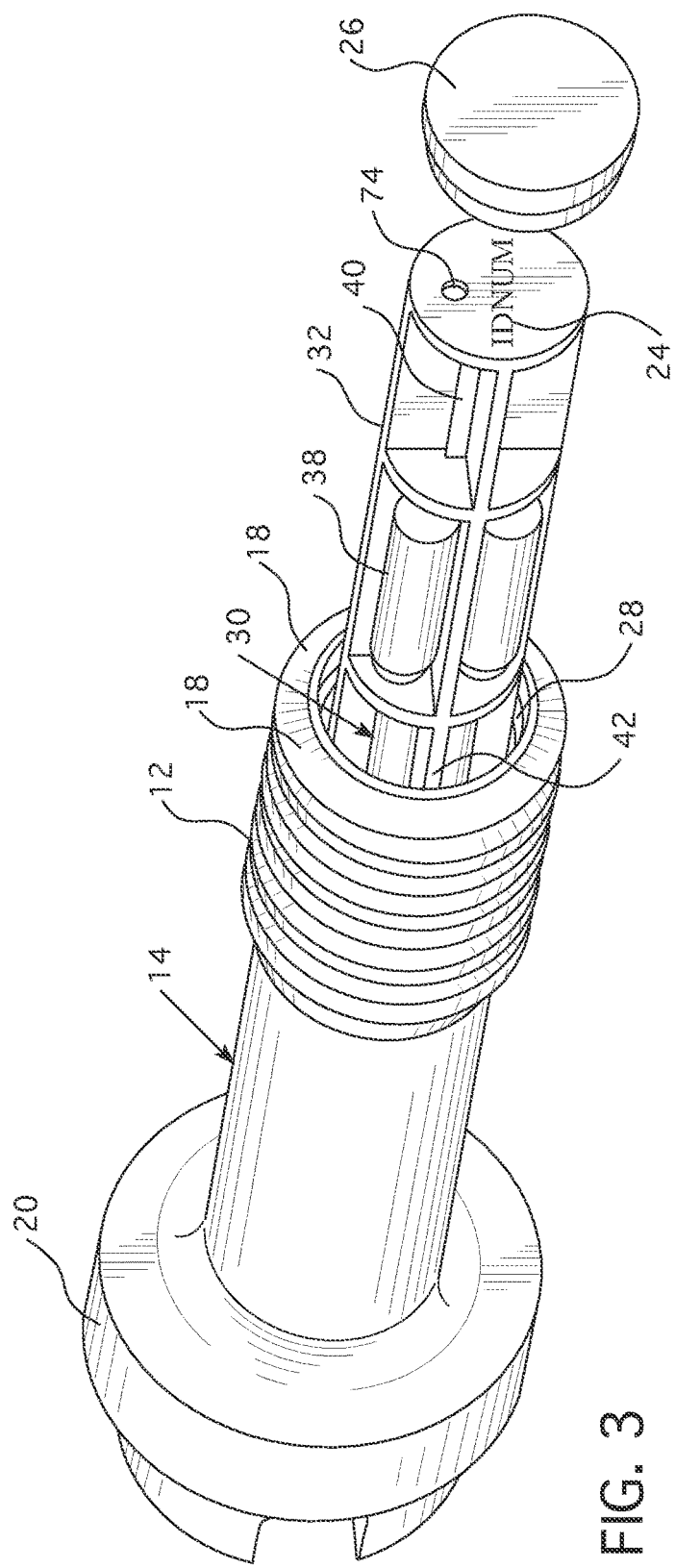
FIG. 3 is a perspective view of the embodiment shown in FIG. 1 with the end cap open and a partitioned sensor module shown partially within the hollow shank of the fastener.

FIG. 3 is a different perspective view of the fastener shown in FIG. 1 with the sensor module 30 partially withdrawn from the hollow cavity 28. As can be appreciated from FIG. 3, the sensors can be supported in circumferentially and axially divided compartments. The sensor module 30 can be keyed as shown at 42 to ride in an axial groove in the sidewall of the hollow cavity 28 to fix the orientation of the sensor module. The outer sheath 32, of the sensor module 30 shown in FIG. 3, has been partially removed to expose the sensors into view.

Accordingly, the fastener sensor of this embodiment has one or more cavities that may contain one or more sensors such as: neutron activation wires surrounded by hypodermic stainless steel tubing; gamma ray dosimetry such as thermoluminescent detectors or LiF crystals; temperature monitors such as melt wires of various metals surrounded by a glass tube; reduced-scale material specimens, (e.g., Charpy or tensile); and/or one or more internal organizers to contain and position any or all of the foregoing.

The device has enough internal space to provide adequate separation between any cadmium shielded neutron activation wires and unshielded neutron activation wires. Dimple marks can be used to determine alignment and rotation orientation relative to well-known reactor vessel internal features; provide location indexing to laboratory personnel loading or unloading device; and further differentiate the sensor bolt from traditional (unmarked) bolts. Preferably, all corners have fillets to reduce stresses during use and a stepped end plug is welded into the bolt to ensure a pressure seal. Desirably, the fastener is constructed from a material that is in whole or in part both resistant to corrosion and has an elemental composition that is conducive to dosimetry applications, e.g., Stainless Steel 347. The bolt 10 may also be constructed from a material that is resistant to corrosion and has an elemental composition that minimizes neutron activation, which will ultimately reduce shipping and handling burdens and the radiation dose to post-irradiation analysis personnel, e.g., titanium.

Figure 4:
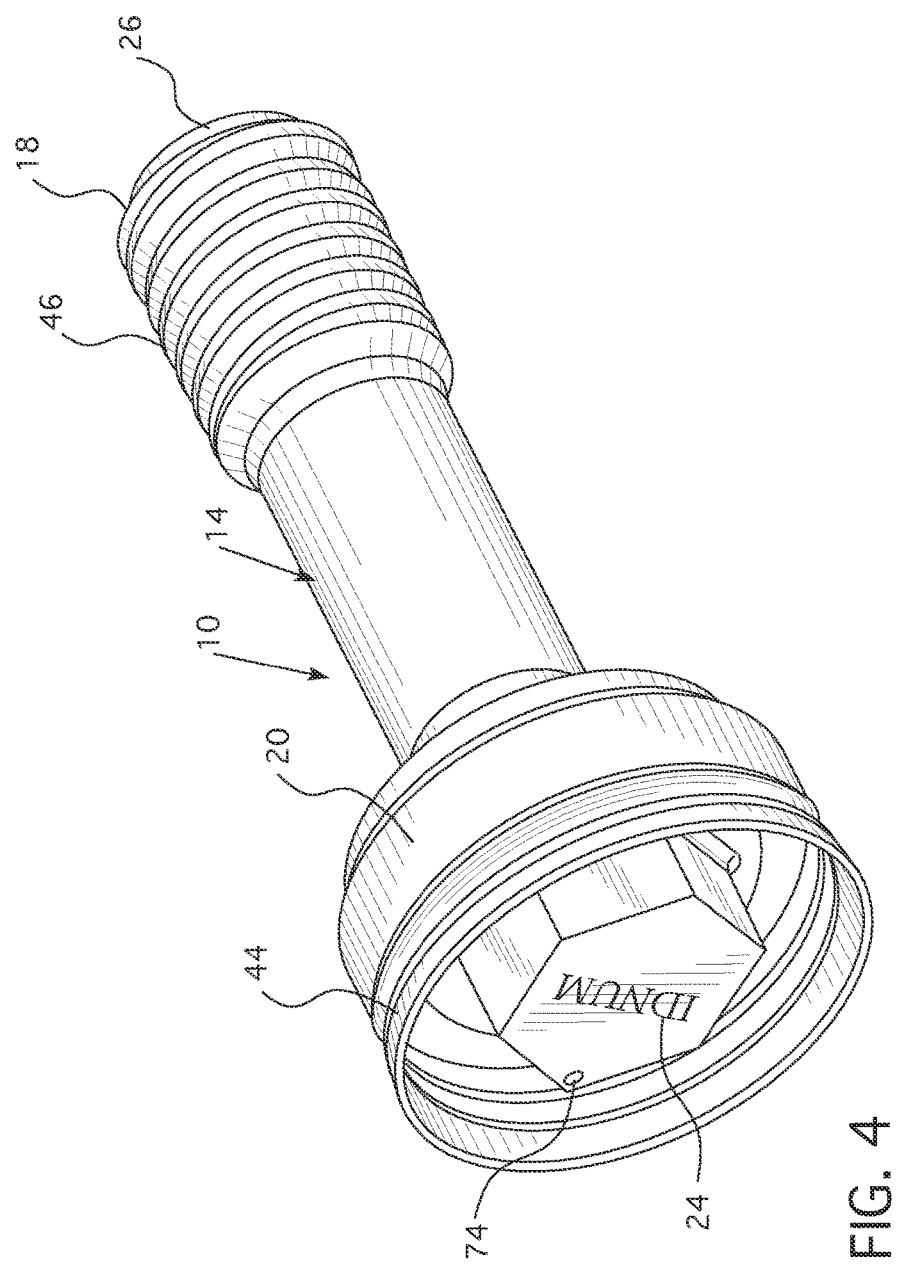
FIG. 4 is a perspective view of a second embodiment of this invention.

An alternate embodiment is illustrated in FIGS. 4 and 5 and differentiates from the foregoing embodiments in that it employs a circumferentially flared feature 44 on the head 20 to mechanically engage with a circumferentially machined groove or other feature in a pre-existing vacant bolt hole. Like reference characters are used to identify corresponding components among the several figures. The embodiment shown in FIGS. 4 and 5 removes the need to perform field welding operations to install lockbars to secure the replacement fastener. The enlarged region 46 on the on the shank 14 of the fastener 10 that is shown as threaded is maintained with the same general profile to mate with the former plate female threads and is not turned down to the reduced diameter shank profile in order to maintain the shielding offered by that material to the shank in a traditional baffle bolt. In other respects, the embodiments illustrated in FIGS. 4 and 5 are similar to that previously described.

Figure 6:
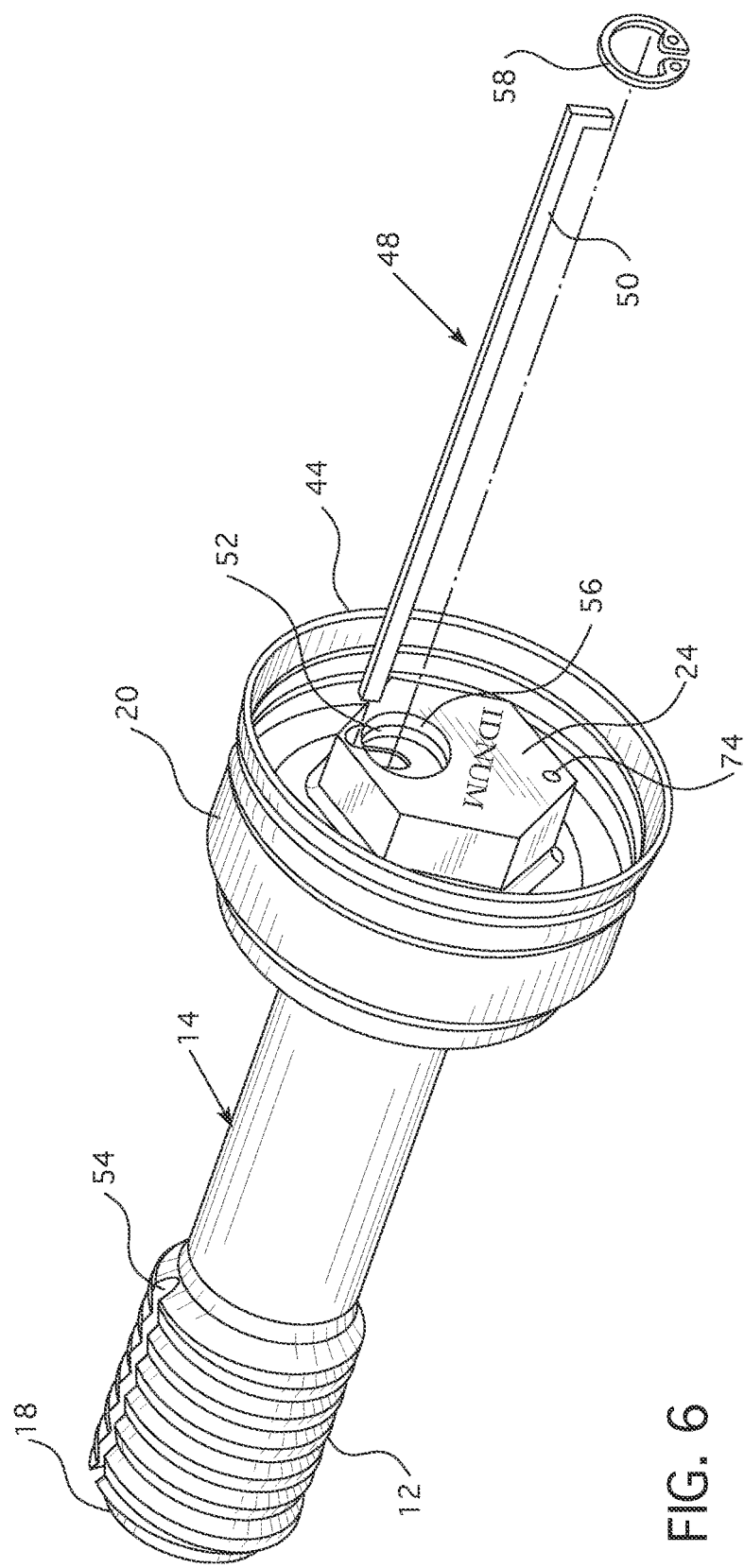
FIG. 6 is a perspective view of a third embodiment of this invention.
Figure 7:
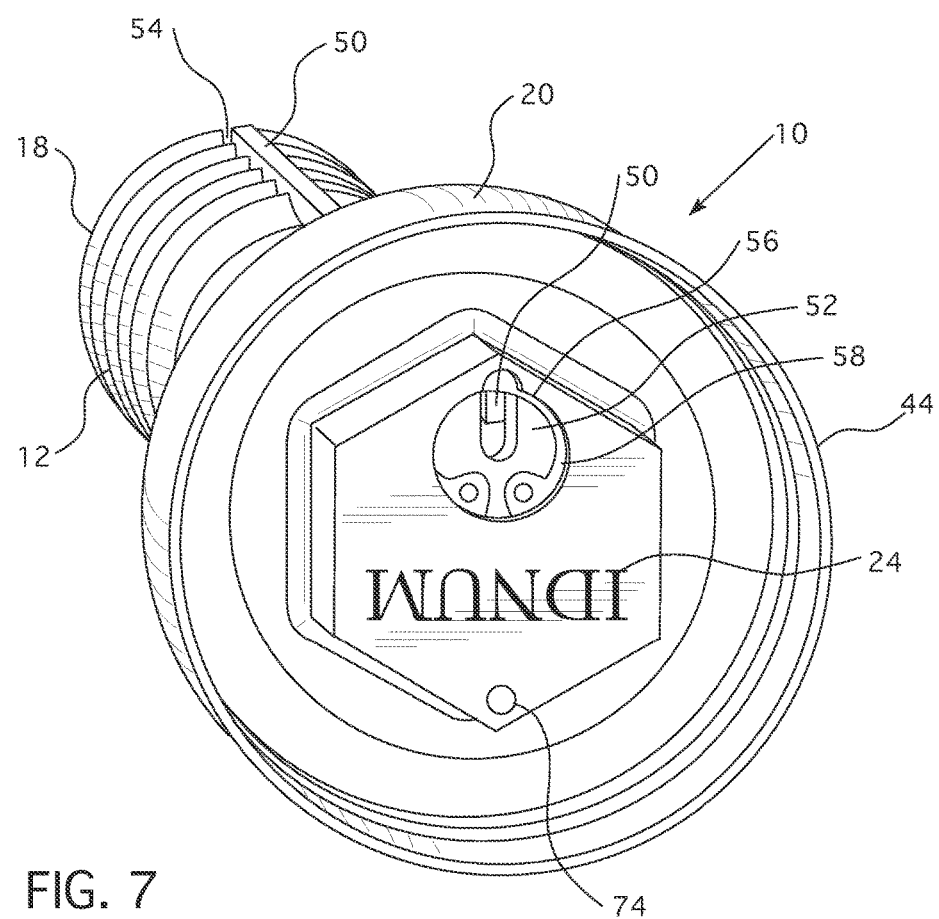
FIG. 7 is a perspective view of the embodiment shown in FIG. 6 with a lockbar secured in position.

FIGS. 6 and 7 illustrate another embodiment of the bolt-type fastener application of the sensor insert claimed hereafter, which is an alternate to that described previously with respect to FIGS. 1-5 and includes a mechanical locking feature 48, which in this case is a lockbar assembly, which mechanically engages and locks the orientation of the threads 12 once installed. This mechanical feature includes a lockbar that is circular, elliptical, or polygonal in cross section that is inserted through a hole 52 in the bolt head 20 and through a slot 54 bored axially through the thread 12 and through a corresponding slot bored through the female thread in the hole in the reactor internals component to which it is secured. The lockbar 50 is fixed in place with an outwardly expanding circular spring clip 58 that expands against a counter bore 56 in the bolt head 20. Alternately, the lockbar may be welded to the head to secure it in position. The lockbar assembly prevents rotation by engaging with and between the slot in the distal end 18 of the dosimetry bolt 10 and the slot through the female thread in the hole of the reactor internals component to which it is secured.

The bolting arrangements in reactor internals components are conservatively specified; meaning that some bolts are extraneous. Preferably, the neutron dosimetry fastener embodiment of the sensor insert of this invention can replace non-load-bearing bolts, though the fasteners constructed in accordance herewith can carry some loads. With internal cavities 28 designed to hold neutron dosimetry, photon dosimetry, maximum temperature monitors and/or material specimens, sealed off, preferably with a welded plug, the contents are secured and protected from the harsh external environment. These cavities can be evacuated and back filled with an inert gas for further protection. In order to allow post-irradiation analysis, the plug 26 is welded to the distal end 18 and has a stepped axial contour that can be cut through and removed in a hot cell. In addition, the sensor insert, internal structures, and/or plug can be made of a material that is both resistant to corrosion and has an elemental composition that is conducive to dosimetry applications, e.g., Stainless Steel 347. Such a material would provide iron, nickel, cobalt, and niobium activation that could be counted later to characterize the neutron flux environment that the device resided within. Alternately, some or all of the sensor insert's material can be chosen to be both resistant to corrosion and have an elemental composition that minimizes neutron activation which will ultimately reduce shipping and handling burdens and the radiation dose to post-irradiation analysis personnel (e.g., titanium).

The sensor inserts, constructed in accordance herewith, can be used in multiple different locations (radially, axially and azimuthally) to provide a three-D map of the radiation and/or temperature environment. These sensor inserts are particularly suited for use as baffle-former bolts, especially in a reactor vessel internals components that undergo significant irradiation and/or have experienced broken bolts thought to be caused by irradiation-induced material changes. The fasteners are designed to installed, affixed, and removed in an identical fashion to the bolts that they are replacing. However, they have identification information to allow plant operators to confirm positioning and orientation. There are also marks that allow laboratory personnel to load and unload the sensor inserts' contents while accurately recording the positions of the contents.

Though the fastener embodiments were stated as particularly suited for use as baffle-former bolts, these types of dosimetry insert devices, i.e., installable devices encapsulating monitors for neutron, peak temperature, and/or gamma ray sensors that are inserted into a reactor internals component, can be used in place of a thimble plug to perform upper core plate monitoring. Such a device could also be inserted into an incore thimble tube and could be located to address any axial position in the lower internals. The foregoing are just examples of the many uses such a device can serve.

Figure 8:
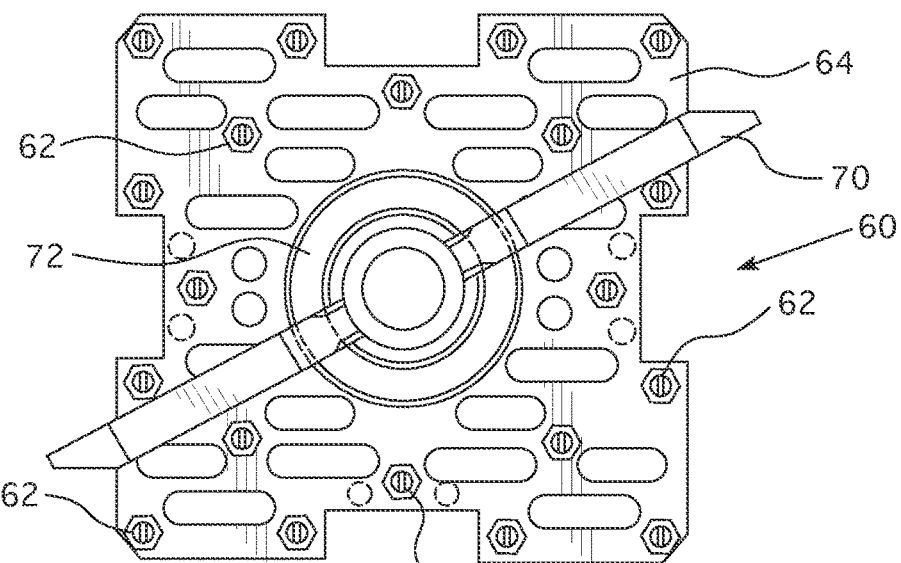
FIG. 8 is a plan view of a plug assembly incorporating one embodiment of this invention.
Figure 9:
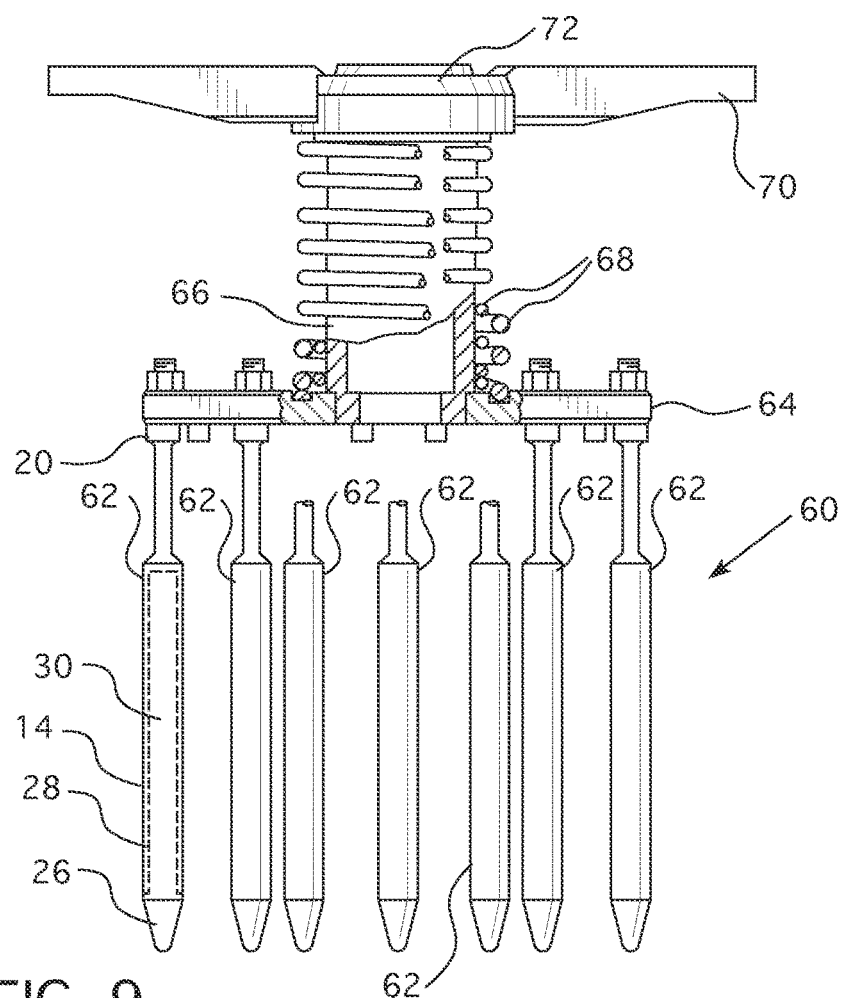
FIG. 9 is an elevation view of the plug assembly shown in FIG. 8.

For example, FIGS. 8 and 9 show one embodiment of a fuel assembly thimble plug assembly which can benefit from this invention. Thimble plug assemblies are inserted in unused thimbles in a fuel assembly located at a position in the core not accessed by the control rods, to restrict flow through some or all of those unused thimbles. As noted above, like reference characters are used to identify corresponding components among the several figures. FIG. 8 is a plan view of a thimble plug assembly 60 and FIG. 9 is an elevational view of the thimble plug assembly of FIG. 8 with one of the thimble plugs 62 (on the left side of the figure) replaced by a sensor insert whose sensor module 30 housed in its internal hollow cavity 28 (represented by the dotted lines) is identical to that described previously. Each of the thimble plugs 62 is supported by and suspended from a base plate 64. The base plate 64 has a vertically extending, centrally located sheath 66 that has an enlarged cap 72 that retains a slidably mounted bar assembly that is biased in an upward direction by a spring 68 wound around the sheath. When positioned in the core with the internals in place, the thimble plugs will be inserted into the empty fuel assembly guide tubes and the bar assembly 70 will be pressed against the upper core plate with the spring 68 compressed to prevent the thimble plug assembly from vibrating. Except for its outward configuration the sensor insert in the form of a thimble plug 62 is internally configured the same as the bolt-type embodiment 10.

A major distinction between the surveillance capsules of the prior art and the sensor insert claimed hereafter is the positioning of the sensors within a reactor internals component or in place of a reactor internals component so that the sensors are intimately in proximity to the region of interest (e.g., within the baffle plates or the upper and lower core plates). In that way the sensors can register the actual environment that the material/component of interest is experiencing.

In contrast, prior art surveillance capsules are positioned in order to irradiate the reactor vessel material samples at an accelerated rate relative to the reactor vessel itself in order to give advance analysis capabilities to determine how the reactor vessel material will behave later in life. However, the positioning also registers a relatively hard neutron spectrum because of the downcomer water further moderating the neutron flux at the reactor vessel relative to the surveillance capsule position on the outside of the core barrel. Also, any thermal gradient due to the water would not be reflected. Thus the surveillance capsules do not provide a truly one-to-one spectral and thermal comparison to what the reactor vessel is experiencing. For the purpose of monitoring the reactor vessel internals, which experience a yet harder spectrum, the sensor inserts of this invention are superior and eliminate any discrepancy in the spectral or thermal environment.

While outwardly it may appear logical to position sensors for monitoring the internals as the prior art surveillance capsules are positioned, however, there are several reasons why that logic is not effective. In the first instance, in the prior art surveillance capsule position the irradiation rate of the sensors would lag that of the actual material/component of interest. Secondly the massive stainless steel reactor internals structures would to some extent shield the sensor from the neutron flux the actual material/component of interest was experiencing. Additionally, the temperature environment would be significantly different as there is a significant temperature differential over the radial extent of the reactor vessel internals. Furthermore, placing the prior art surveillance capsules on the outside of the core barrel provides a conservative reading of the environmental effects on the reactor vessel material. However, placing the reactor internals sensors on the outside of the core barrel, for the reasons noted above is non-conservative and would not provide information representative of what the internals are or will be experiencing.

Furthermore, while specific embodiments of the invention have been described in detail, it will be appreciated by those skilled in the art that various modifications and alternatives to those details could be developed in light of the overall teachings of the disclosure. For example, the sensors, rather than being loaded through the distal end, may be loaded through an opening in the head that is later sealed with a plug. Accordingly, the particular embodiments disclosed are meant to be illustrative only and not limiting as to the scope of the invention which is to be given the full breadth of the appended claims and any and all equivalents thereof.

What is claimed is:

1. A nuclear reactor internals component having a sensor insert for monitoring one or more environmental conditions surrounding the sensor insert's location within a reactor internals, the nuclear reactor internals component comprising;
   a head;
   an elongated shank extending from the head to a distal end, the shank having a hollow compartment extending at least partially between the distal end and the head and a cross-sectional profile of the elongated shank being sized to fit into an opening in the reactor internals;
   an end plug for sealing off the hollow compartment at the distal end, affixed to the distal end;
   one or more self-contained, passive environmental sensors secured within the hollow compartment in the sensor insert; and
   an anchor for fixing the elongated shank in the opening in the reactor internals, the anchor including a locking mechanism that fixes an orientation of the shank within the opening in the reactor internals, wherein the locking mechanism is a lockbar that extends through an opening in the head and through a groove on a surface off the shank and partially into a groove in a surface of a wall in the opening in the reactor internals, in which the shank is to be inserted.

2. The nuclear reactor internals component of claim 1 wherein the one or more self-contained, passive environmental sensors comprise a plurality of environmental sensors respectively configured to monitor different environmental parameters.

3. The nuclear reactor internals component of claim 1 wherein the one or more environmental sensors comprise material samples, dosimetry or maximum temperature monitors.

4. The nuclear reactor internals component of claim 1 wherein the sensor insert includes one or more coded markings that identify the location of the sensor insert within the reactor internals.

5. The nuclear reactor internals component of claim 4 wherein the coded markings identify the orientation of the sensor insert within the reactor internals.

6. The nuclear reactor internals component of claim 1 wherein the anchor comprises one of either a male or female thread extending over at least a portion of the shank, that is sized to mate with another of a male or female thread on the opening in the reactor internals.

7. The nuclear reactor internals component of claim 1 wherein the lockbar is held in position within the opening in the head by a spring clip wedged against a portion of the head.

8. The nuclear reactor internals component of claim 7 wherein the spring clip is wedged in a counter-bore in a surface of the head.

9. The nuclear reactor internals component of claim 8 wherein the spring clip is a circular spring clip.

10. The nuclear reactor internals component of claim 1 wherein the shank has an axial dimension along an elongated dimension of the shank and the hollow compartment is partitioned into separate axial compartments in the sensor insert in which the one or more self-contained, passive environmental sensors are respectively supported.

11. The nuclear reactor internals component of claim 1 comprising a plurality of self-contained passive environmental sensors secured within the hollow compartment, wherein the hollow compartment is partitioned into separate circumferential compartments in the sensor insert in which the plurality of self-contained, passive environmental sensors are respectively supported.

12. The nuclear reactor internals component of claim 1 comprising a plurality of self-contained passive environmental sensors secured within the sensor insert within the hollow compartment, wherein the plurality of self-contained, passive environmental sensors are housed within the sensor insert comprising a partitioned sheath within which the plurality of self-contained, passive environmental sensors are separated, with the sheath sized to slide into and out of the hollow compartment.

13. The nuclear reactor internals component of claim 12 wherein the sheath has a positioning feature that fixes the orientation of the sheath relative to the hollow compartment.

14. The nuclear reactor internals component of claim 12 wherein the sheath has a coded marking that identifies the sensor insert in which it resided.

15. The nuclear reactor internals component of claim 12 wherein the sheath includes a gripping feature proximate the distal end to ease movement of the sheath out of the hollow compartment.

16. The nuclear reactor internals component of claim 1 wherein the one or more environmental sensors includes a neutron activation wire that is enclosed within a stainless steel tubing with cadmium shielding.

17. The nuclear reactor internals component of claim 1 wherein the shank comprises Stainless Steel 347 and/or titanium.

18. The nuclear reactor internals component of claim 1 wherein the distal end of the shank has a larger circumference than a portion of the shank that extends from the head.

19. The nuclear reactor internals component of claim 1 wherein the head has a flared circumferential extension configured to mechanically engage with a circumferentially-machined groove or slot in the opening in the reactor internals.

20. The nuclear reactor internals component of claim 1 wherein the reactor internals component is configured to resemble a bolt used elsewhere in the reactor internals.

21. The nuclear reactor internals component of claim 1 wherein the reactor internals component is configured to function as a thimble plug.

22. The nuclear reactor internals component of claim 1 wherein the reactor internals component has an external profile substantially equal to a profile of another reactor internals component.

* * * * *